United States Patent
Hershey et al.

(10) Patent No.: US 9,563,889 B2
(45) Date of Patent: Feb. 7, 2017

(54) METHOD AND APPARATUS FOR SECURE WIRELESS POINT OF SALE TRANSACTIONS

(75) Inventors: John Erik Hershey, Ballston Lake, NY (US); Michael James Hartman, Clifton Park, NY (US); Richard Louis Zinser, Niskayuna, NY (US); John Anderson Fergus Ross, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 829 days.

(21) Appl. No.: 12/392,751

(22) Filed: Feb. 25, 2009

(65) Prior Publication Data

US 2010/0217677 A1  Aug. 26, 2010

(51) Int. Cl.
| | | |
|---|---|---|
| *G06Q 20/00* | (2012.01) | |
| *G06Q 40/00* | (2012.01) | |
| *G06Q 20/32* | (2012.01) | |
| *G06Q 20/04* | (2012.01) | |
| *G06Q 20/10* | (2012.01) | |
| *G06Q 20/20* | (2012.01) | |
| *G06Q 20/34* | (2012.01) | |
| *G06Q 20/38* | (2012.01) | |
| *G07F 7/08* | (2006.01) | |

(52) U.S. Cl.
CPC .......... *G06Q 20/3278* (2013.01); *G06Q 20/04* (2013.01); *G06Q 20/10* (2013.01); *G06Q 20/20* (2013.01); *G06Q 20/202* (2013.01); *G06Q 20/32* (2013.01); *G06Q 20/341* (2013.01); *G06Q 20/352* (2013.01); *G06Q 20/385* (2013.01); *G06Q 40/00* (2013.01); *G07F 7/088* (2013.01); *G07F 7/0866* (2013.01); *G07F 7/0893* (2013.01)

(58) Field of Classification Search
CPC ................................ G06Q 20/00; G06Q 40/00
USPC ........................ 705/64, 18, 16, 21, 35, 39
See application file for complete search history.

(56) References Cited

U.S. PATENT DOCUMENTS

| | | | | |
|---|---|---|---|---|
| 7,630,294 | B2 * | 12/2009 | Berndt ................. | H04M 7/006 370/217 |
| 7,685,190 | B2 * | 3/2010 | Adelson ................ | G06Q 20/10 705/35 |
| 7,865,427 | B2 * | 1/2011 | Wright .................. | G06Q 20/04 705/35 |
| 8,160,934 | B2 * | 4/2012 | Carlson ............. | G06Q 10/0637 705/14.64 |
| 2002/0059146 | A1 * | 5/2002 | Keech .................... | G06Q 20/02 705/64 |
| 2004/0243517 | A1 * | 12/2004 | Hansen ................. | G06Q 20/00 705/64 |

(Continued)

OTHER PUBLICATIONS

Rivest, Ronald L., "Chaffing and Winnowing: Confidentiality without Encryption" Jan. 17, 1999 (as verified by web.archive.org), 2nd revision, 8 Pages.*

(Continued)

*Primary Examiner* — Andrew Joseph Rudy
(74) *Attorney, Agent, or Firm* — Jean K. Testa; Fletcher Yoder, P.C.

(57) ABSTRACT

In an embodiment, a method of masking transaction data for a secure wireless transaction includes transmitting wireless pseudo transaction data that includes false transaction data and processing received pseudo transaction data and transaction data to extract or separate the transaction data.

22 Claims, 4 Drawing Sheets

(56) References Cited

U.S. PATENT DOCUMENTS

2005/0060233 A1\* 3/2005 Bonalle .................. G06Q 20/00
   705/16
2008/0283592 A1\* 11/2008 Oder, II ................ G06Q 20/20
   235/380
2009/0224884 A1\* 9/2009 Tuttle .................. G06K 7/0008
   340/10.1

OTHER PUBLICATIONS

Haselsteiner, Ernst et al., "Securit in Near Field Communication" 2006 Paper submitted to RFID Security 06, 11 Pages.\*
Savry O. et al., RFID Noisy Reader How to Prevent from Eavesdropping on the Communication? CHES 2007, LNCS 4727, pp. 334-345, 2007, Springer-Verlag Berlin Heidelberg 2007.\*
Rivest, Ronald L., "Chaffing and Winnowing: Confidentiality without Encryption" Jan. 17, 1999, $2^{nd}$ revision, 8 pages.\*
Haselsteiner, Ernest et al., "Security in Near Field Communication" 2006 Paper submitted to RFID security 06, 11 Pages.\*
"Near Field Communication in the Real World, Part II", Innovision Research & Technology pp. 1-13; www.innovision-group.com.
"Near Field Communication White Paper", Ecma International, Ecma/TC32-TG19/2004/1; www.ecma-international.org.
U.S. Appl. No. 12/334,019, filed Feb. 25, 2009, Richard Louis Zinser.
U.S. Appl. No. 12/334,009, filed Dec. 16, 2008, Richard Louis Zinser.

\* cited by examiner

METHOD AND APPARATUS FOR SECURE WIRELESS POINT OF SALE TRANSACTIONS

BACKGROUND OF THE INVENTION

The subject matter disclosed herein relates to wireless transaction devices, and, more specifically, to communication traffic used to enable secure transactions between a purchaser and a point-of-sale device.

Merchants often use point-of-sale (POS) systems to complete sales transactions. POS systems may include several independent devices, each performing a different function. For example, a scanner may ring up articles of merchandise and transmit the amount to a cash register to calculate the amount due. The cash register may then transmit the amount due to a credit card reader to receive payment. The credit card reader may use a wireless protocol, such as near field communication or Bluetooth, to communicate with a transacting instrument, such as a credit card that includes a wireless enabled computer chip. The convenience of such wireless transactions enables efficient and rapid purchases, increasing profitability and sales.

However, the use of wireless transaction devices may lead to a breach of security and, in some cases, to compromising financial or personal information of the purchaser. Specifically, an eavesdropping device, utilized by an unauthorized third party, may intercept critical security information, enabling the third party to access credit and/or banking information of the purchaser. These security concerns may prevent or slow adoption and use of wireless POS devices, thereby reducing productivity and sales for retailers that may otherwise be able to use the highly efficient wireless POS systems and technology.

BRIEF DESCRIPTION OF THE INVENTION

In one embodiment, a secure point of sale system includes an output configured to transmit wireless pseudo transaction data and an input configured to wirelessly receive data including the pseudo transaction data and transaction data from a transaction instrument located near the point of sale system. The input is configured to process wirelessly received data. A processor is configured to receive the wirelessly received data from the input and to remove the pseudo transaction data from the wirelessly received data, thereby enabling use of the transaction data. In another embodiment, a method of masking transaction data for a secure wireless transaction includes transmitting wireless pseudo transaction data that includes false transaction data and processing received pseudo transaction data and transaction data to extract the transaction data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
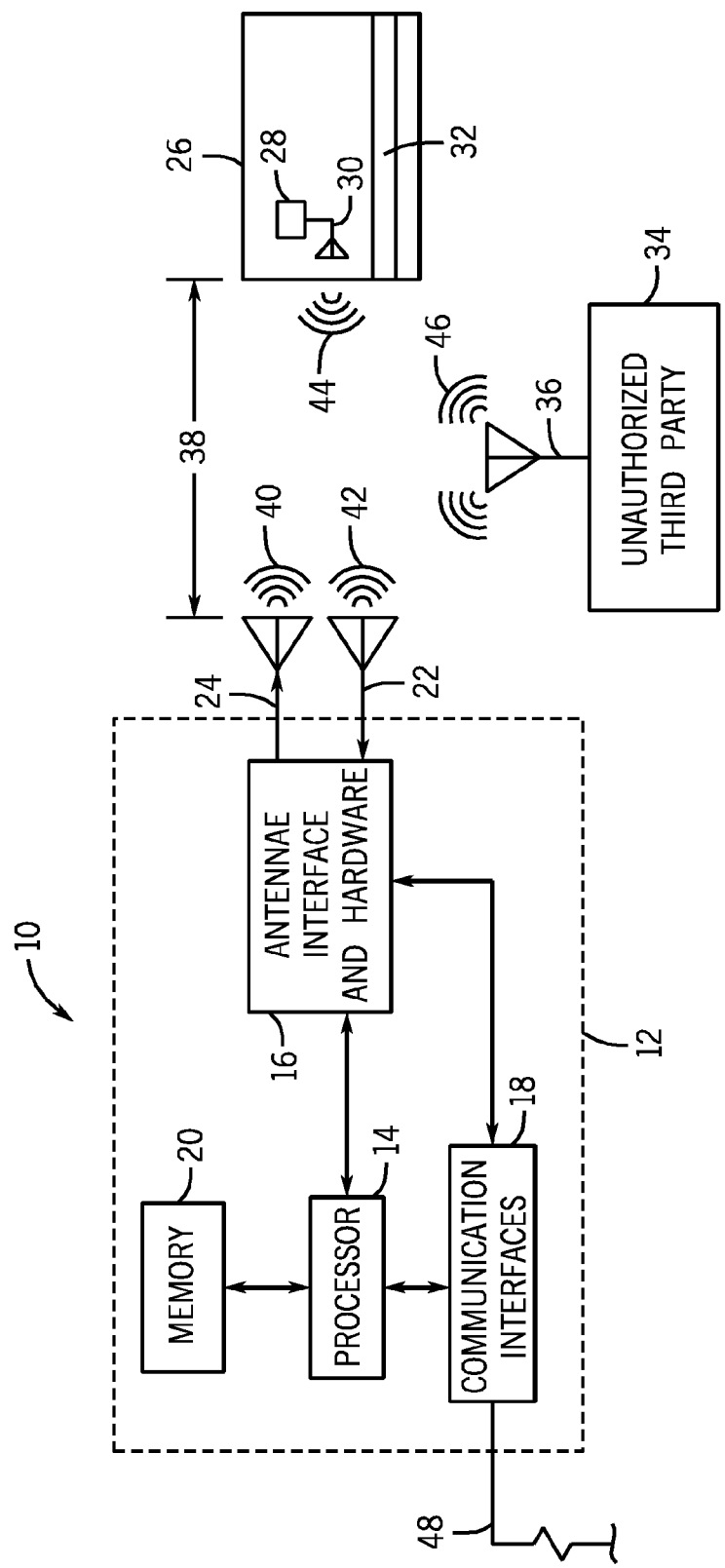
FIG. 1 is a schematic diagram of a secure POS system, shown interacting with a co-transacting instrument and unauthorized third party in accordance with an embodiment.

FIG. 1 is a schematic diagram of an embodiment of a secure POS system and devices used to communicate between transacting parties. As depicted, the POS system 10 includes a POS device 12, which has several components that may be used to process and communicate information for a financial transaction. Specifically, the POS device 12 may include a processor 14, which may be connected to an antenna interface 16. The processor 14 may be configured to perform calculations, routines, and algorithms independently, or in conjunction with a software application configured to perform a transaction. Further, the processor 14 may be coupled to the antenna interface 16, which receives and transmits data to and from the POS device 12. The data transmitted or received by the antenna interface may be of a specific protocol, thereby enabling a transaction to be performed. For example, a protocol used for financial transactions, such as credit card "swiping" transactions, may be used to wirelessly perform the transaction. In addition, the processor 14 and antenna interface 16 may be coupled to a communication interface 18, which may enable the POS device 12 to communicate, via a wireless and/or with a wired connection, to other devices that may be utilized during a transaction. The processor 14 may also be coupled to a memory device 20, which enables storage data, such as transaction information, retailer information, inventory information, or other information about the POS device 12 that may be used during a transaction.

In the diagram, the secure POS system 10 includes a receiver antenna 22 and a transmitter antenna 24. The receiver antenna 22 may be coupled to the antenna interface 16, thereby enabling reception and communication of transaction data signals, according to a selected protocol, that are processed and transmitted within POS device 12 by antenna interface 16. For example, antenna interface 16 may include additional hardware, such as an analog to digital converter, which may be used to process the received data into a format that is communicated to, and understood by, the processor 14 and/or communication interface 18. The transmitter antenna 24 is also coupled to antenna interface 16, wherein the transmitter antenna 24 may be used to communicate or wirelessly broadcast data signals generated by the antenna interface 16 and its associated hardware components. For example, a signal generator, including a digital to analog (D/A) converter and source components, may be used to generate and transmit a signal containing transaction data configured to mimic transaction data from a co-transacting party, thereby providing a mask or shield for communication of the transaction data of the co-transacting party.

As depicted, the POS device 12 may communicate with a co-transacting transaction instrument 26. The transaction instrument 26 may be a credit card, debit card, or other device used to perform a financial transaction electronically. For example, the transaction instrument 26 may include a communication device or component 28 that may be coupled to antenna 30. Specifically, communication component 28 may be microprocessor or integrated circuit configured to communicate to another co-transacting device or instrument, such as the POS device 12 via a selected communication protocol. The communication component 28 may be a passive or active integrated circuit that may communicate wirelessly, via near-field communication (NFC) or Bluetooth communication protocols, which may be used to transmit transaction data between co-transacting instruments. In one embodiment, the transaction instrument 26 may be an NFC-enabled smartphone configured to communicate financial information of a customer via transaction data to the POS device to enable a transaction to be performed between the co-transacting parties.

In a presently contemplated embodiment, the transaction instrument 26 may include a magnetic information strip 32, such as those currently used on credit and debit cards. For example, a consumer may wirelessly communicate via the component 28 and antenna 30 instead of utilizing the magnetic information strip 32 along with a reader (e.g., at a retailer or other transaction location) to perform a faster and more accurate financial transaction. Accordingly, the consumer may perform a transaction faster and more efficiently, thereby providing retailers who use the secure POS system 10 with increased sales and more efficient operations. As discussed herein, co-transacting parties may include a pair of parties intending to perform a transaction, such as a purchase or transfer of funds. Each of the co-transacting parties may use their own transaction instruments or co-transacting instruments to perform the transaction. For example, a consumer (co-transacting party) may utilize the transaction instrument 26 (co-transacting instrument), such as a credit card, to purchase an item from a retailer (co-transacting party) via the POS device 12 (co-transacting instrument). In the example, the consumer is one co-transacting party and the retailer is another co-transacting party. A bank and an account holder at the bank may also be an example of co-transacting parties. It is to be noted, however, that the systems and techniques described herein are not limited to "sales", but more generally to all types of transactions that may make use of such wireless exchanges that may be intercepted by unwanted interlopers or eavesdroppers.

However, the use of a wireless communication network and interfaces for communication of transaction data may pose security risks for the co-transacting parties. For example, a consumer using the transaction instrument 26 to communicate with the POS device 12 may be concerned that an unauthorized third party 34 may attempt to eavesdrop on communications using antenna 36 during the exchange of transaction data, thereby accessing a financial information, identifying information, personal information, and so forth. During a wireless transaction, the co-transacting parties may be within distance 38 of one another, wherein the unauthorized third party 34 may be able to eavesdrop on the wireless transaction. Accordingly, the secure POS system 10 provides hardware and/or software components, including the processor 14 and antenna interface 16, that may enable false traffic to be transmitted. The false traffic helps to disguise or hide the actual transaction data, and may be in the form of pseudo transaction data 40, configured to mimic or appear as transaction data to the unauthorized third party 34. As discussed in detail below, the antenna interface 16 and its associated hardware may be used to generate the pseudo transaction data 40 which may be used to shield or mask the actual transaction data of the co-transacting party. Further, wirelessly received data 42 may be received by the antenna interface 16, which may include transaction data 44 from the co-transacting party as well as pseudo transaction data 40. The wirelessly received data 42 may then be communicated to the processor 14. The antenna interface 16 and the processor 14 may be configured to remove or filter out the pseudo transaction data 40 from the received wirelessly received data 42, thereby producing the transaction data 44 transmitted by the transaction instrument 26. It should be noted that the term "transaction data" is intended to include any and all data transmitted to or from the transaction instrument that may be used to identify either, the instrument, the co-transacting party, or that can be used with other data for this purpose. Pseudo transaction data, on the other hand, refers to any purposeful noise data, not actually related to the transaction at hand with the co-transacting party, that may include, but is not limited to, data that might appear as a bogus or mimicked transaction or include bogus identifying data. Wirelessly received data includes both pseudo transaction data and transaction data, wherein a party to the transaction may be able to remove the pseudo transaction data to process the transaction data.

The transaction instrument 26 may be actively self powered or passively powered by a wirelessly received signal. For example, the transaction instrument 26 may transmit data only in response to a communication from an active device, such as the POS device 12. In such an example, the transaction data 44 may be transmitted on top of, or piggy-backed on, the active device signal, pseudo transaction data 40. Alternatively, the transaction data 44 may be transmitted independently on a signal that is the same frequency as pseudo data 40, and is thereby masked by the pseudo data 40 signal. Moreover, the pseudo transaction data may include a watermark or a tracking signature, which enables the tracing of attempted uses of the pseudo transaction data by the unauthorized third party 34. The secure POS system 10 may also include a network communication link 48 that may be connected to a modem, a backplane, a network hub, a bus, additional POS devices, or other devices that may be used to perform a transaction. For example, communication link 48 may be a wireless local area network (WLAN), an Ethernet network, or a controller area network (CAN) based system.

Figure 2:
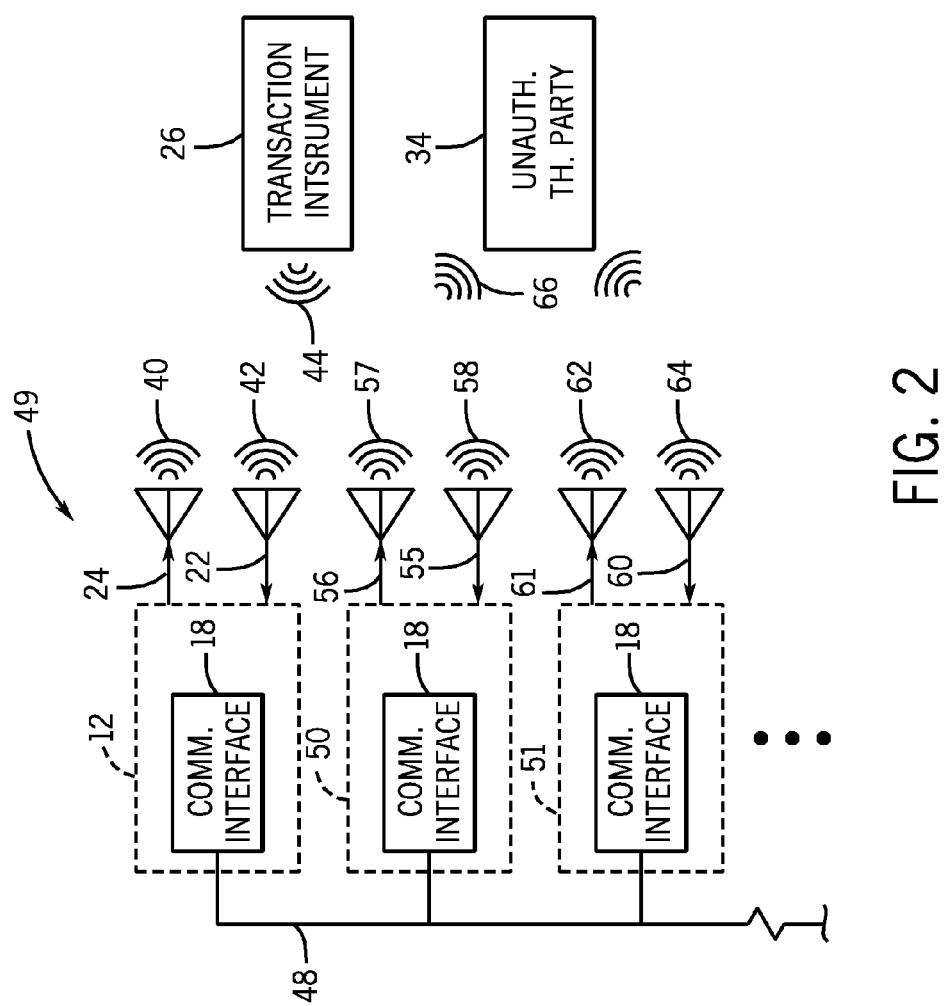
FIG. 2 is a schematic diagram of a multi device secure POS system, again interacting with a co-transacting instrument and unauthorized third party in accordance with an embodiment.

FIG. 2 is a schematic diagram of an embodiment of a secure multi-POS device system 49. The multi-POS device system 49 may include a plurality of POS devices 12, 50 and 51, connected by communication link 48. As depicted, the POS devices 12, 50 and 51 may have several components removed to enhance clarity. POS devices 12, 50 and 51 each include a communication interface 18, which is connected to the network communication link 48. The network communication link 48 may be a wireless or wire based link using a suitable network to enable communication between the POS devices 12, 50, and 51. In the illustrated embodiment, the POS devices 12, 50, and 51 may be connected to an Ethernet hub, thereby allowing communication between the POS devices and a network. The POS device 12 also includes receiver antenna 22 and transmitter antenna 24. Similarly, the POS device 50 includes receiver antenna 55 and transmitter antenna 56. Transmitter antenna 56 may be used to transmit pseudo transaction data 57 and the receiver antenna 55 may be used to receive transaction data 58. In addition, the POS device 51 includes receiver antenna 60 and transmitter antenna 61. Transmitter antenna 61 may be used to transmit pseudo transaction data 62 and the receiver antenna 60 may be used to receive transaction data 64.

As discussed in detail below, each of the POS devices 12, 50, and 51 may include hardware and/or software components configured to remove the pseudo transaction data from the wirelessly received data, thereby enabling a secure wireless transaction to be executed with the remaining transaction data. In the embodiment, transaction instrument 26 may transmit transaction data 44 that may be used to perform the transaction. Further, the POS device 50 may transmit the additional pseudo transaction data communication 57 that may be broadcast using a similar protocol as is used for pseudo transaction data 40. Receiver antenna 22 may be configured to receive wirelessly received data 42. Further, the receiver antenna 22 may receive inter-device transmissions of pseudo transaction data 57 and 62. In such a case, the multi-POS device system 49 may be configured to allow communication between devices via network communication link 48, thereby enabling receiver antenna 22 and the POS device 12 to remove pseudo transaction data 57 and 62 from the additional POS devices. For example, the contents and format of pseudo transaction data 57 communication transmitted by POS device 50 may be transmitted via network communication link 48 to POS device 12.

In an embodiment, each of the POS devices (12, 50 and 51) may operate on a unique frequency channel to enable transaction data to be processed by each of the devices. In other embodiments, a technique such as orthogonal code division separation may be utilized to distinguish between transactions. In some embodiments, frequency separation or time separation may be utilized to distinguish between transactions and remove pseudo transaction data in multi POS systems. In another configuration, pseudo transaction data may be locally stored prior to transactions in each of the POS devices, where the POS devices are synchronized such that they know when each POS device transmits a particular type of pseudo transaction data. Alternatively, each of the device antennas (22, 24, 55, 56, 61, 60) may be configured to provide some degree of isolation from the other POS devices transactions. In another embodiment, each of the POS devices may be preprogrammed to emit the same pseudo transaction data. In such a case, each of the POS devices would be able to remove the pseudo transaction data transmitted by all of the POS devices from the wirelessly received data by utilizing the same technique used to remove the pseudo transaction data emitted by the local or receiving POS device itself. Further, the POS devices would not need a communication link to identify the pseudo transaction data, because the pseudo transaction data is the same or unified for all of the devices, enabling the local device to recognize and remove the pseudo transaction data based on its own pseudo transaction data.

In addition, components within POS device 12, including processors chips, signal processors, and/or a software application, may be configured to receive wirelessly received data 42 and remove pseudo transaction data 40, 57 and 62 from the wirelessly received signal 42, using information from POS device 50 and 51 as well as generated pseudo transaction data from POS device 12. In addition, transmitter antenna 61 of POS device 51, may transmit pseudo transaction data 62, while receiver antenna 60 receive transaction data 64, which may then be processed and analyzed by components within POS device 51 as described above. As depicted, the unauthorized third party 34 may receive transaction data 66 over the wireless network, which may include pseudo transaction data from a plurality of POS devices wherein the transaction data 66 includes the pseudo transaction data 40, 57 and 62 used to mask the transaction data 26, thereby providing a secure transaction system for the co-transacting parties.

Figure 3:
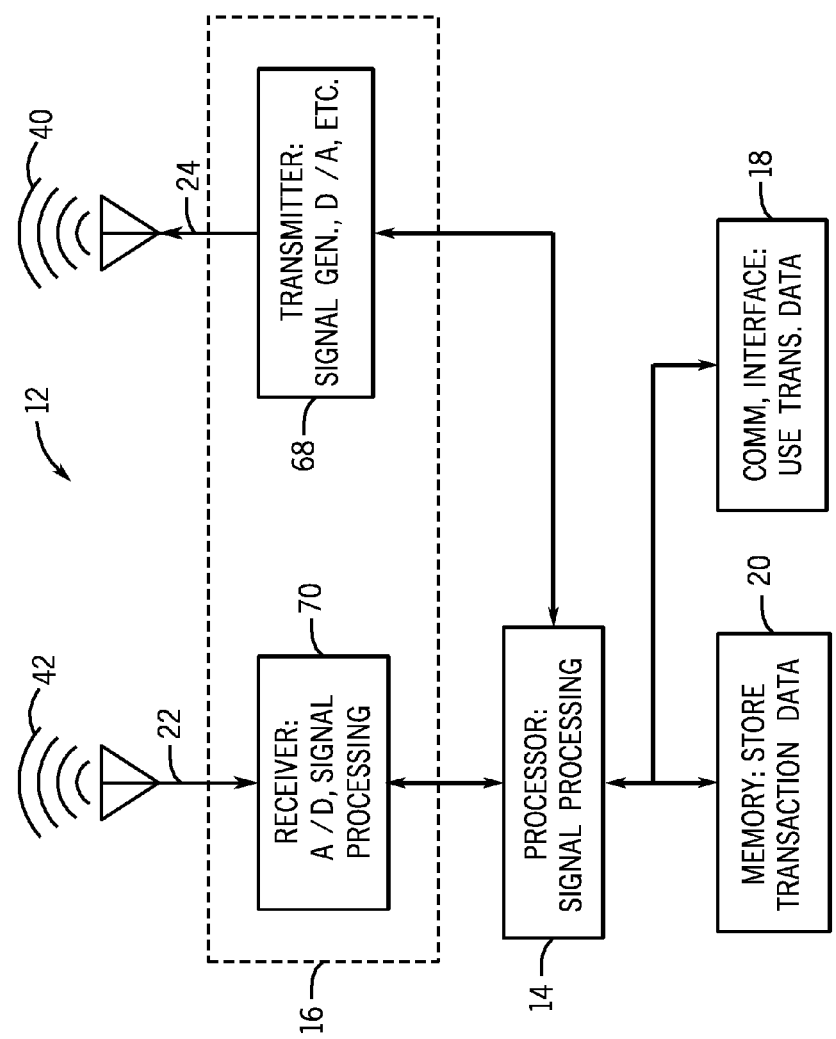
FIG. 3 is a detailed schematic diagram of a secure POS device, including a processor, transmitter, receiver, and other components, in accordance with an embodiment.

FIG. 3 is a schematic diagram of an embodiment of the POS device 12. POS device 12 includes the processor 14 and antenna interface 16. In the illustrated embodiment, antenna interface 16 includes hardware that may be used to communicate, generate, transmit, and/or receive data signals. A transmitter 68 may be included in the antenna interface 16, thereby enabling signal generation and output of transaction data 40 via transmitter antenna 24. In addition, the antenna interface 16 may include receiver 70, configured to receive wirelessly received data 42 signals including pseudo transaction data 40 and transaction data 44, and process the received data from receiver antenna 22. Transmitter 68 and receiver 70 may include integrated circuits, processors, appropriate hardware, and/or software which may be used to receive, transmit, process, or translate transaction data communication signals. Transaction data signals may be routed from transmitter 68 and receiver 70 to processor 14 to enable processing of the wirelessly received data 42. For example, processor 14 may be configured to receive an input of the generated pseudo transaction data 40 from transmitter 68 which may be used by the processor 14 to process and remove the pseudo transaction 40 from the wirelessly received data 42 that is directly transmitted from receiver 70 to the processor 14. The wirelessly received data 42, routed from receiver 70, may include pseudo transaction data 40 as well as the co-transacting party transaction data 44. The processor may use hardware and/or software applications to process the direct input of pseudo transaction data 40 from transmitter 68 to remove the pseudo transaction data 40 from the wirelessly received data 42, thereby enabling use of the co-transacting party's transaction data 44 for performing a transaction. The POS device 12 enables a secure transaction between co-transacting parties by using the pseudo transaction data 40 to mask the co-transacting party transaction data 44. In addition, the transaction data 44 from the co-transacting party may be routed to a memory device 20 for storage and/or to a communication interface 18 that may communicate the transaction information to a network or additional parties for verification and processing.

Figure 4:
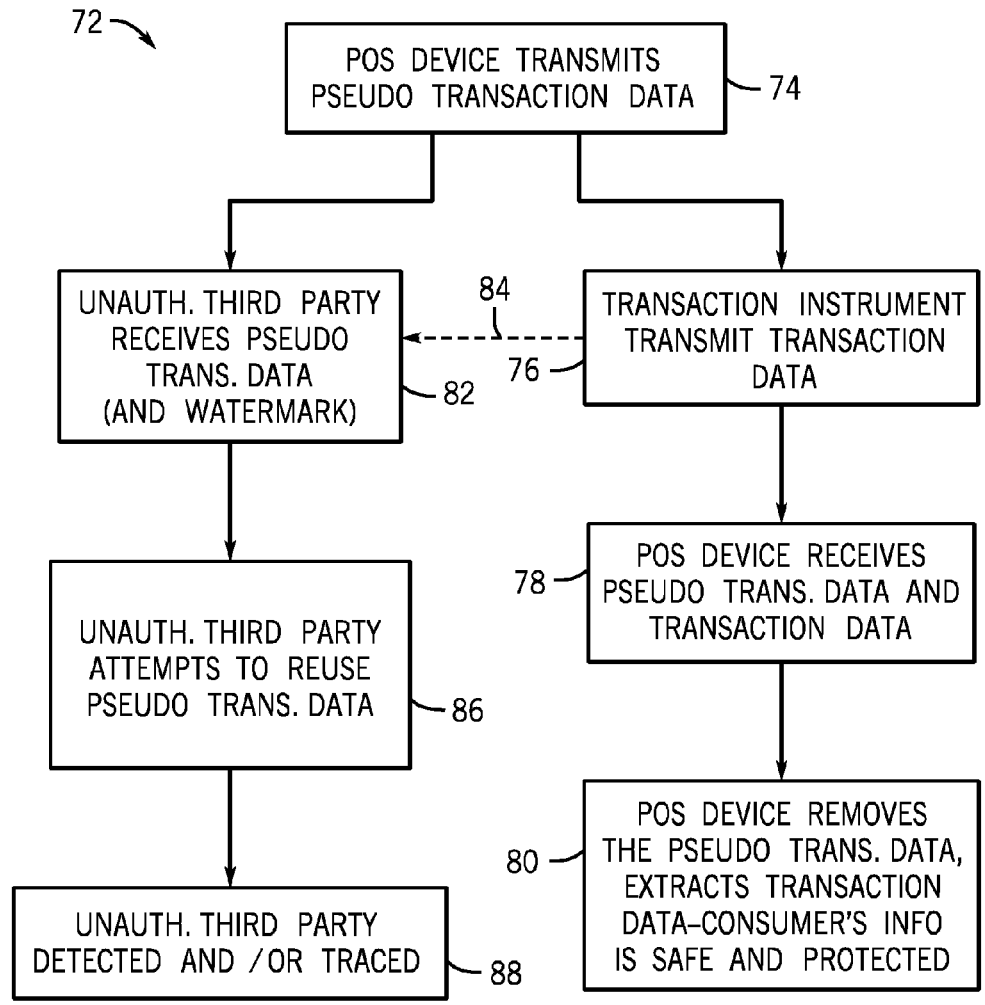
FIG. 4 is a flowchart illustrating a technique for performing a secure wireless transaction and protecting the critical transaction data in the process, in accordance with an embodiment.

FIG. 4 is a flow chart 72 of a technique used to perform a secure POS transaction between two wirelessly co-transacting parties. In step 74, the POS device transmits pseudo transaction data on a wireless network. For example, the POS device may transmit data using a standard protocol, such as communication on an NFC network. In step 76, a co-transacting party transaction instrument transmits transaction data wirelessly back to the POS device. The co-transacting party transaction instrument may be a credit card or debit card that includes a NFC communication device that actively or passively communicates wirelessly with the POS device to perform a financial transaction, e.g. a consumer purchasing an item from a retailer. In step 78, the POS device receives pseudo transaction data and transaction data from the wireless network. As previously discussed, the pseudo transaction data may be configured to mimic actual transaction data, and thereby shielding or masking the transaction data from the co-transacting party. Accordingly, important financial and account information of the co-transacting parties in the transaction data is protected by the pseudo transaction data.

In step 80, the POS device may utilize a processor and/or other hardware and software components to remove the pseudo transaction data, wherein the co-transacting party transaction data is protected by the POS devices use of pseudo transaction data. In step 82, the unauthorized third party may receive the pseudo transaction data configured to mimic the transaction data. Further, the pseudo transactions data may include a watermark for tracing an attempted use of the pseudo transaction data by an eavesdropping unauthorized third party. For instance, the unauthorized third party may receive the wirelessly received data 42 including the pseudo transaction data 40 and the transaction data 44 via a broadcast signal but may not be able to decipher or extract the transaction data 44 from the signal, where the pseudo data 40 effectively masks, disguises, or blocks the transaction data from being read by the unauthorized third party. As indicated by arrow 84, the co-transacting party transaction data may be broadcast on a wireless network, wherein the co-transacting party and other proximate parties may receive the transaction data. Accordingly, the only instrument or device on the wireless network that may read the transaction data and remove the pseudo transaction data may be the POS device that has access to or created the pseudo transaction data. In step 86, the unauthorized third party may attempt to use the pseudo transaction data to perform a counterfeit or fraudulent financial transaction. In step 88, during or after the attempted use of the pseudo transaction data, the unauthorized third party may be detected due to the watermark within the pseudo transaction data. Specifically, a watermark within the pseudo transaction data may provide a flag that may be recognized by authorities, financial institutions, retailers, and other parties that enables identification and tracing of a party's attempt to use unauthorized information.

Technical effects of the invention include enhanced transaction security, leading to increased profits and efficiency for retailers utilizing wireless POS systems for transactions with consumers. Various configurations of software and/or hardware based systems may be utilized to generate and process received communications that include pseudo transaction data that may be used to shield or mask transaction data from an unauthorized third party. For example, an embodiment may include hardware, including a digital-to-analog converter and signal generator, configured to generate a signal for the pseudo transaction data configured to mimic a consumer's transaction data to an unauthorized third party. Further, the signal may also be communicated to hardware within the POS device, such as a filter and processor, configured to process received data and remove the pseudo transaction data signal from the transaction data, thereby enabling a secure transaction with the POS device. These hardware components included in the POS device may be hardware components controlled by software, programmed by software, or run strictly by preprogrammed hardware. By utilizing a secure wireless POS transaction device and method, a retailer may securely use the equipment, increasing efficiency and profitability.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method of conducting a secure wireless sales transaction, comprising:
    wirelessly transmitting pseudo transaction data from a first wireless transaction instrument with a transmitter of the first wireless transaction instrument, wherein the pseudo transaction data is transmitted independently from actual transaction data;
    wirelessly receiving combined data at the first wireless transaction instrument, with a receiver of the first wireless transaction instrument, after wirelessly transmitting the pseudo transaction data, wherein the combined data comprises the pseudo transaction data together with the actual transaction data and the combined data is from a second wireless transaction instrument of a co-transacting party;
    processing the combined data with a processor of the first wireless transaction instrument to remove the pseudo transaction data from the combined data to separate the actual transaction data from the pseudo transaction data; and
    performing a transaction with the co-transacting party based on the actual transaction data.

2. The method of claim 1, wherein transmitting the pseudo transaction data comprises transmitting false transaction data configured to mimic a protocol of the actual transaction data.

3. The method of claim 1, wherein processing the combined data comprises processing a first input of the pseudo transaction data and a second input of the combined data to remove the pseudo transaction data.

4. The method of claim 1, wherein wirelessly transmitting the pseudo transaction data comprises transmitting a watermark.

5. The method of claim 1, wherein processing the combined data comprises identifying a transmission from the second wireless transaction instrument of the co-transacting party and the actual transaction data.

6. The method of claim 1, wherein wirelessly transmitting the pseudo transaction data comprises transmitting false transaction data via a near field communication network.

7. The method of claim 1, wherein wirelessly receiving the combined data comprises receiving the pseudo transaction data from a plurality of point of sale devices and receiving the actual transaction data from the second wireless transaction instrument of the co-transacting party.

8. The method of claim 7, wherein processing the combined data comprises utilizing direct inputs of the pseudo transaction data from the plurality of point of sale devices to remove the pseudo transaction data from the actual transaction data.

9. The method of claim 7, wherein processing the combined data includes utilizing orthogonal code division separation to isolate the actual transaction data of the co-transacting party.

10. The method of claim 7, wherein processing the combined data includes processing a locally stored version of the pseudo transaction data to identify the pseudo transaction data from the plurality of point of sale devices.

11. The method of claim 7, wherein the pseudo transaction data from the plurality of point of sale devices comprises false transaction data that is the same for each of the point of sale devices.

12. The method of claim 7, wherein processing the combined data includes utilizing frequency separation to isolate the actual transaction data of the co-transacting party.

13. The method of claim 7, wherein processing the combined data includes utilizing time separation to isolate the actual transaction data of the co-transacting party.

14. A method of masking transaction data for a secure wireless transaction, comprising:
    wirelessly transmitting pseudo transaction data from a first wireless transaction instrument with a transmitter of the first wireless transaction instrument, wherein the pseudo transaction data is transmitted independently from actual transaction data, and wherein the pseudo transaction data includes false transaction data; and
    processing, with a processor of the first wireless transaction instrument, combined data including the pseudo transaction data and the actual transaction data to extract the actual transaction data from the combined data after wirelessly transmitting the pseudo transaction data.

15. The method of claim 14, wherein the false transaction data is configured to mimic a protocol of the actual transaction data.

16. The method of claim 14, wherein processing the combined data comprises processing a first input of the pseudo transaction data directly from a generator of the pseudo transaction data and a second input of the combined data to remove the pseudo transaction data.

17. The method of claim 14, comprising receiving the combined data from a wireless network and communicating the combined data to a processor.

18. The method of claim 14, wherein processing the combined data comprises receiving the combined data at a processor and identifying a transmission from a second wireless transaction instrument of a co-transacting party and the actual transaction data.

19. The method of claim 17, wherein processing the combined data comprises receiving the pseudo transaction data from a plurality of point of sale devices and receiving the actual transaction data from a second wireless transaction instrument of a co-transacting party.

20. The method of claim 19, comprising wirelessly transmitting the pseudo transaction data from the plurality of point of sale devices, wherein transmitters of each of the plurality of point of sale devices are isolated from one another.

21. The method of claim 17, wherein wirelessly transmitting the pseudo transaction data comprises transmitting a watermark to enable a tracing of a third party attempting to use the pseudo transaction data.

22. The method of claim 17, wherein wirelessly transmitting the pseudo transaction data comprises transmitting the pseudo transaction data via a near field communication network.

* * * * *